US008189209B2

(12) United States Patent  
Nakanishi

(10) Patent No.: US 8,189,209 B2  
(45) Date of Patent: May 29, 2012

(54) IMAGE FORMING APPARATUS

(75) Inventor: Shinichi Nakanishi, Osaka (JP)

(73) Assignee: Kyocera Mita Corporation (JP)

(*) Notice: Subject to any disclaimer, the term of this patent is extended or adjusted under 35 U.S.C. 154(b) by 799 days.

(21) Appl. No.: 12/357,719

(22) Filed: Jan. 22, 2009

(65) Prior Publication Data

US 2009/0190153 A1    Jul. 30, 2009

(30) Foreign Application Priority Data

Jan. 25, 2008 (JP) .................................. 2008-015627

(51) Int. Cl.
*G06F 15/00* (2006.01)
*G06F 3/12* (2006.01)
*G06K 1/00* (2006.01)
(52) U.S. Cl. ........................................ 358/1.13; 358/1.1
(58) Field of Classification Search .................. None
See application file for complete search history.

(56) References Cited

U.S. PATENT DOCUMENTS 7,755,780 B2 * 7/2010 Ohta et al. ................... 358/1.13
7,817,294 B2 * 10/2010 Mitsui .......................... 358/1.15

FOREIGN PATENT DOCUMENTS

JP    H07-134517 A    9/2005

* cited by examiner

*Primary Examiner* — Douglas Tran
(74) *Attorney, Agent, or Firm* — Ostrolenk Faber LLP

(57) ABSTRACT

An image forming apparatus includes a setting section, a setting display section, a determination section, a change section, and an incompatible option display section. The setting section sets image formation functions, which include first and second functions. The setting display section displays a single or plurality of options on each of setting screens. The single or plurality of options is set as a setting condition for each function. The setting screens respectively correspond to the functions. The determination section determines if a combination of options is incompatible. The change section changes a display form of the option of the first function when the determination section determines that the combination is incompatible. The incompatible option display section displays a setting screen of the option of the second function when the option of the first function is selected after the display form of the option of the first function is changed.

4 Claims, 7 Drawing Sheets

IMAGE FORMING APPARATUS

CROSS-REFERENCE TO RELATED APPLICATIONS

This application claims priority under 35 U.S.C. §119 to Japanese Patent Application No. 2008-015627 filed on Jan. 25, 2008. The entire disclosure of Japanese Patent Application No. 2008-015627 is hereby incorporated herein by reference.

BACKGROUND OF THE INVENTION

Field of the Invention

The present invention relates to an image forming apparatus such as a printer, a copier, and a multifunction peripheral (MFP).

Recently, image forming apparatuses (e.g., a copier and a MFP) have become indispensable office machines in working environments (e.g., an office in a company). Meanwhile, image forming apparatuses have been recently widely used at home. Their functions have been increasingly diversified. For example, a copier is configured to be capable of realizing a variety of functions. The variety of functions include selection of printing paper, selection of a paper feeding tray, zoom-in/out printing, color printing, duplex printing, and combined printing for printing a plurality of pages in a sheet of paper by reducing the sizes of the pages.

The diversified functions have an advantage in that a variety of user's demands are satisfied by them. However, they also have a drawback in that operations are complicated in accordance with the increasingly diversified functions. In the above-mentioned example, a user is not allowed to makes a photocopy until the user completes settings for all of the functions. For example, a user needs to select sequentially a series of options including a printing paper type, a paper feeding tray, monochrome printing, and single-side printing.

The above-mentioned functions are generally configured to be set through the operation of a touch panel. In accordance with diversified functions, contents to be displayed on the touch panel have been increasingly complicated. When a plurality of setting screens is configured to be displayed on the touch panel, the screens are often configured to be switched back and forth to set a plurality of functions. This often increases the user's burden in operating the image forming apparatus. When a user is unfamiliar with the operation of machines, the unskilled user needs to ask a skilled user to explain the operation every time the unskilled user uses the image forming apparatus.

To solve the above-mentioned problem, Japan Patent Application Publication No. JP-A-H07-134517 discloses an invention to save a user's functional setting step by executing a group of functional settings preliminarily stored as a program.

However, the art disclosed in the patent application publication has the following problems. When some of a variety of functions are set in combination, some combinations may be incompatible.

One of the examples is a combination of a printing paper and a paper feeding tray. When a user uses an envelope or a cardboard as a printing paper, the user is only allowed to select a manual feeding tray as the paper feeding tray. In other words, the user is not allowed to select the other paper feeding trays with respect to the printing paper of the above-mentioned type. Thus, when a combination of two or more setting conditions (i.e., options) is not permitted, this condition is hereinafter simply referred to as "an incompatible combination," or "options incompatible in combination."

Especially in a working environment (e.g., office of a company), an image forming apparatus is often installed for each department in a company. In the environment, all the members of each department share the image forming apparatus. Therefore, it is conceivable that a user sets a predetermined function and subsequently another user tries to change a setting of another function. In this case, the former user's functional setting and the latter user's functional setting may be incompatible in combination. However, the former user is theoretically capable of setting a plurality of functions. Therefore, it is difficult to specify which function is actually the cause of the incompatible combination.

This is also true for such a case in which a group of functional settings are set by a program as in the above-mentioned prior art. Specifically, when a user tries to change a part of a group of functional settings, the intended setting change may be incompatible with any of the original functional settings. In this case, it is difficult to specify which functional setting is the cause of the incompatible combination.

On the other hand, only a current functional setting could be important while other functional settings are allowed to be changed. In this case, it is effective to perform an operation (e.g., photocopy) by specifying a function responsible for the incompatible functional combination and canceling/changing the setting of the responsible function as soon as possible.

Accordingly, aspects of the present invention have been created to solve the above-mentioned problems occurring in the conventional practice, and to provide an image forming apparatus for clearly and quickly displaying a function contributing to the cause of incompatible functional combination and for canceling the incompatible functional combination by changing the setting of the responsible function.

In view of the above, it will be apparent to those skilled in the art from this disclosure that there exists a need for an improved image forming apparatus. This invention addresses this need in the art as well as other needs, which will become apparent to those skilled in the art from this disclosure.

SUMMARY OF THE INVENTION

For the purpose of solving the above-mentioned problems and achieving the object, the following aspects of the present invention are produced.

A first aspect of the present invention relates to an image forming apparatus. The image forming apparatus includes a setting section and a setting display section. The setting section is configured to set a plurality of functions of image formation. The plurality of functions includes first and second functions. The setting display section is configured to display selectably a single or plurality of options on each of the setting screens. The single or plurality of options is set as a setting condition of each of the plurality of functions. The setting screens respectively correspond to the plurality of functions.

The image forming apparatus further includes a determination section and a change section. The determination section is configured to determine if a combination of an option of the first function and an option of the second function is incompatible. The change section is configured to change a display form of the option of the first function when the determination section determines that the combination is incompatible. With the configuration, a user is capable of grasping the incompatible functions at a glance.

The image forming apparatus further includes an incompatible option display section. The incompatible option display section is configured to display a setting screen of the option of the second function when the option of the first function is selected after the display form of the option of the first function is changed. With the configuration, a user is capable of visually confirming the function responsible for the incompatible combination, and is capable of canceling the incompatible combination by changing the setting of the function responsible for the incompatible combination through the operation of the screen.

As described above, according to the present invention, it is possible to display clearly and quickly a function responsible for the incompatible combination. Therefore, it is possible to change the setting of the function through the operation of the screen, and cancellation of the incompatible combination is easily executed.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the embodiment, the present invention is realized as a digital multifunction peripheral (digital MFP, an embodiment of an image forming apparatus).

Figure 1:
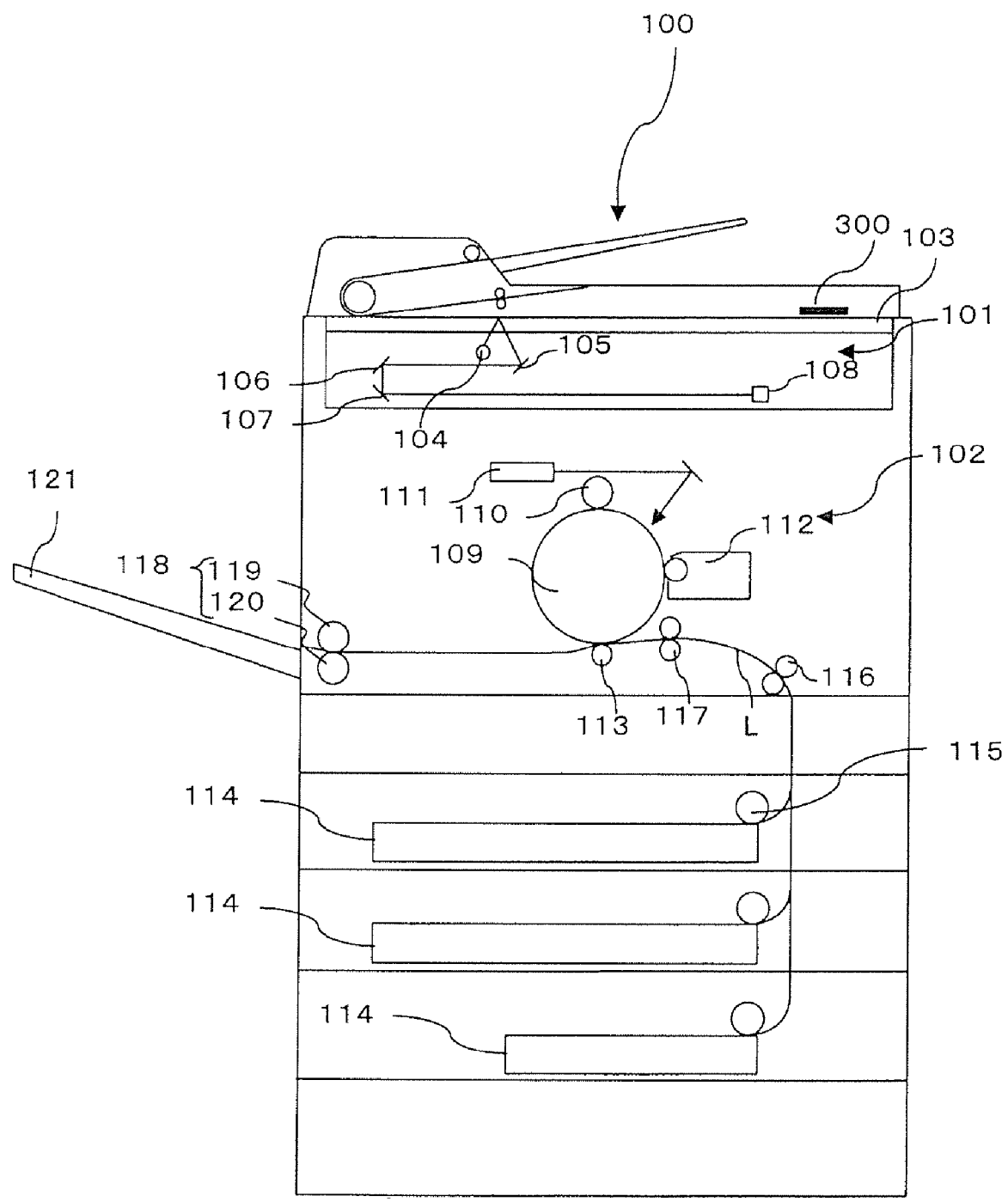
FIG. 1 is a view of a schematic diagram illustrating an entire configuration of an image forming apparatus according to a preferred embodiment of the present invention.

FIG. 1 is a view of a schematic diagram illustrating an entire configuration of a MFP 100 according to a preferred embodiment of the present invention. When a user makes a photocopy using the MFP 100, the user puts a manuscript on a platen 103. Then, the user inputs a copy instruction by operating an operating button. The operating button is provided on a touch panel 300 disposed in the vicinity of the platen 103. When the copy instruction is received by the MFP 100, the following elements (driving sections) are activated. Thus a series of copy procedure are performed.

In an image scanning section 101, light irradiated by a light source 104 is reflected by the manuscript disposed on the platen 103. Then, the reflected light is guided to an image sensor 108 (e.g., a charge coupled device (CCD)) through mirrors 105, 106, and 107. The image sensor 108 performs photoelectric conversion with respect to the received light. Thus the image scanning section 101 scans an image on the manuscript as image data.

An image forming section 102 includes a photosensitive drum 109. The photosensitive drum 109 is configured to rotate in a predetermined direction at a constant velocity. A variety of elements are disposed around the photosensitive drum 109. Specifically, an electrostatic charger 110, an exposing unit 111, a developing unit 112, and a transfer unit 113 are sequentially arranged from the upstream of the rotational direction of the photosensitive drum 109. The electrostatic charger 110 is configured to charge uniformly the surface of the photosensitive drum 109. The exposing unit 111 is configured to irradiate a light onto the surface of the photosensitive drum 109 in accordance with the image data scanned by the image scanning section 101. Thus, an electrostatic latent image is formed on the photosensitive drum 109. The developing unit 112 is configured to form a toner image on the photosensitive drum 109 by attaching toner to the electrostatic latent image formed by the exposing unit 111. The transfer unit 113 is configured to transfer the toner image formed on the photosensitive drum 109 onto a sheet of paper. The image forming section 102 performs the above-mentioned series of processing in conjunction with rotation of the photosensitive drum 109.

When the image forming section 102 performs printing, a sheet of paper is taken out of any one of the paper feeding cassettes 114 by way of a pickup roller 115. Then, the taken-out paper is transported through a transporting path L. The paper feeding cassettes 114 respectively accommodate different sizes of paper. In printing, a user selects paper size depending on usage, and accordingly a sheet of paper of the selected size is configured to be fed from a corresponding paper feeding cassette 114. The paper taken out to the transporting path L is configured to be transported between the photosensitive drum 109 and the transfer unit 113 by way of a transport roller 116 and a resist roller 117.

A fixing device 118 is provided with a heat roller 119 and a pressure roller 120. When the paper passes between the heat roller 119 and the pressure roller 120, heat and pressure are applied to the paper. Thus, a visible image is fixed on the paper. The amount of heat applied by the heat roller 119 is optimally set depending on the paper size for the purpose of appropriately performing fixing processing. After the paper passes the fixing device 118, the paper is discharged to the paper discharge tray 121.

Figure 2:
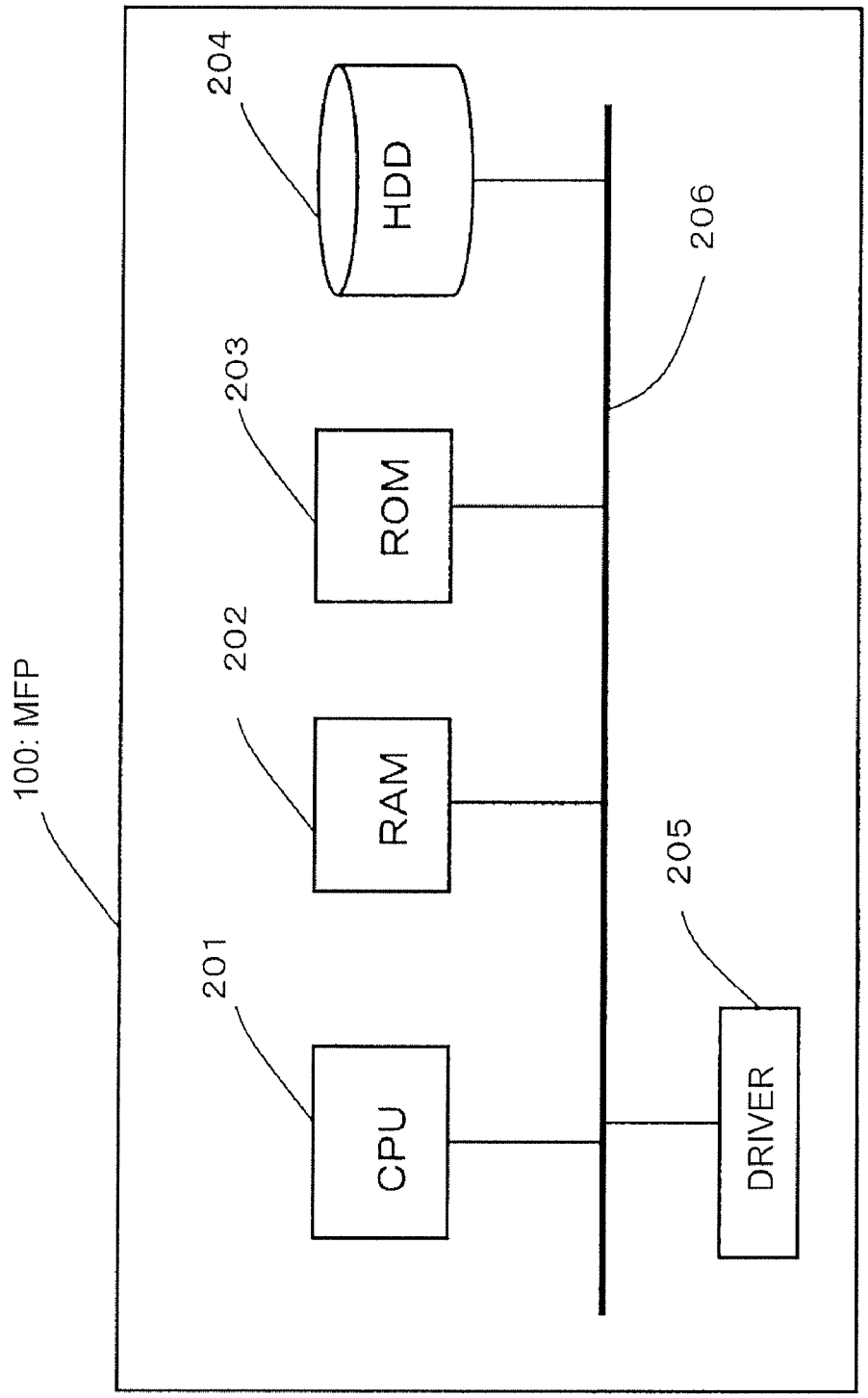
FIG. 2 is a view of a diagram illustrating a hardware configuration of the image forming apparatus of the present invention.

FIG. 2 is a view of a schematic diagram illustrating control-related elements of the MFP 100 of the present embodiment. The MFP 100 includes a central processing unit (CPU) 201, a random access memory (RAM) 202, a read only memory (ROM) 203, a hard disk drive (HDD) 204, and a driver 205. These elements are connected by an internal bus 206. Note that the driver 205 corresponds to driving sections to be driven in printing. For example, the CPU 201 uses the RAM 203 as a work space, and executes programs stored in the ROM 203, the HDD 204, and the like. Furthermore, the CPU 201 transmits/receives data and commands to/from the driver 205 based on the result of the executed programs. Thus, the control unit 201 controls actions of the driving sections illustrated in FIG. 1. Additionally, the after-mentioned elements (see FIG. 3) other than the driving section are configured to be realized when the CPU 201 executes the programs.

Figure 3:
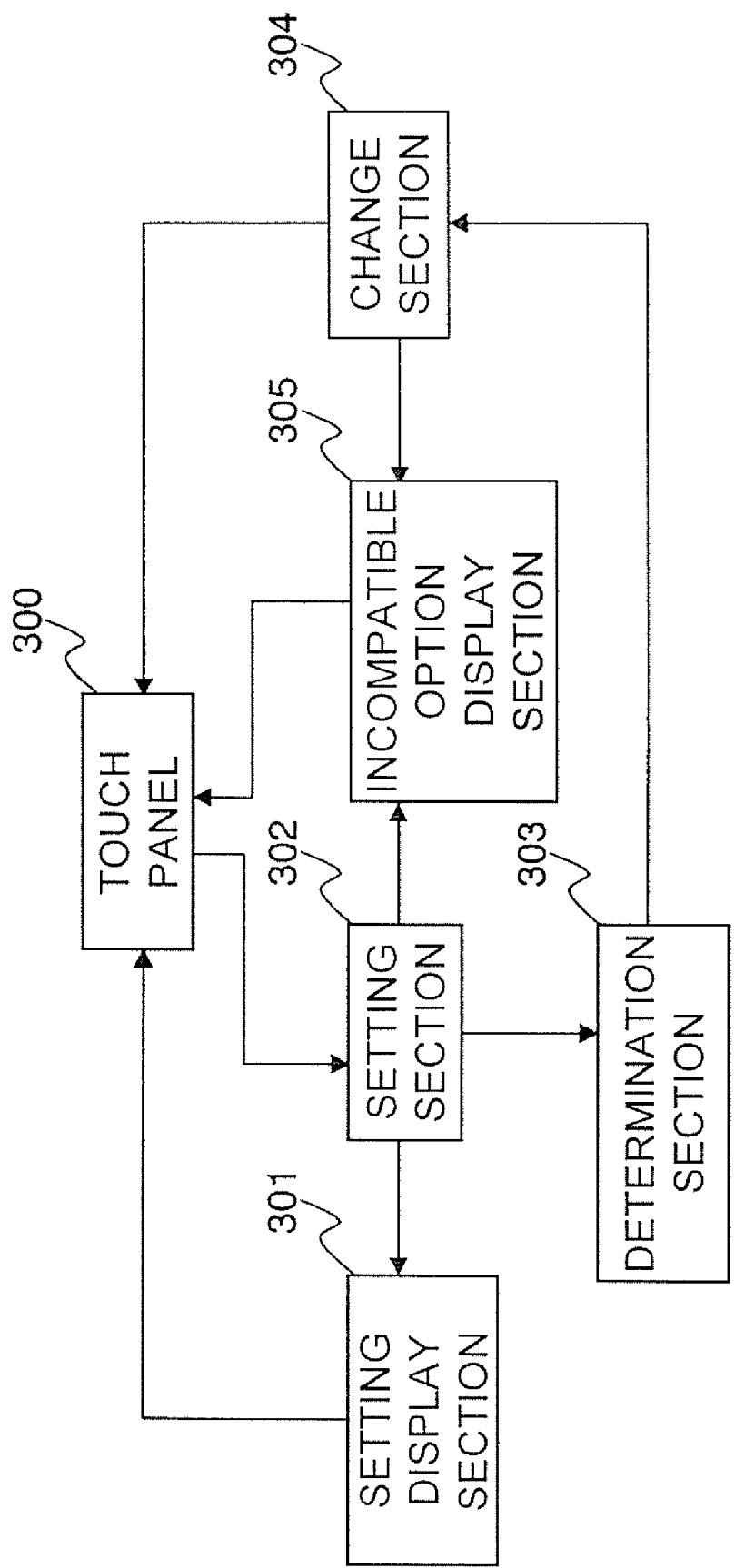
FIG. 3 is a view of a diagram illustrating a software configuration of the image forming apparatus.
Figure 4:
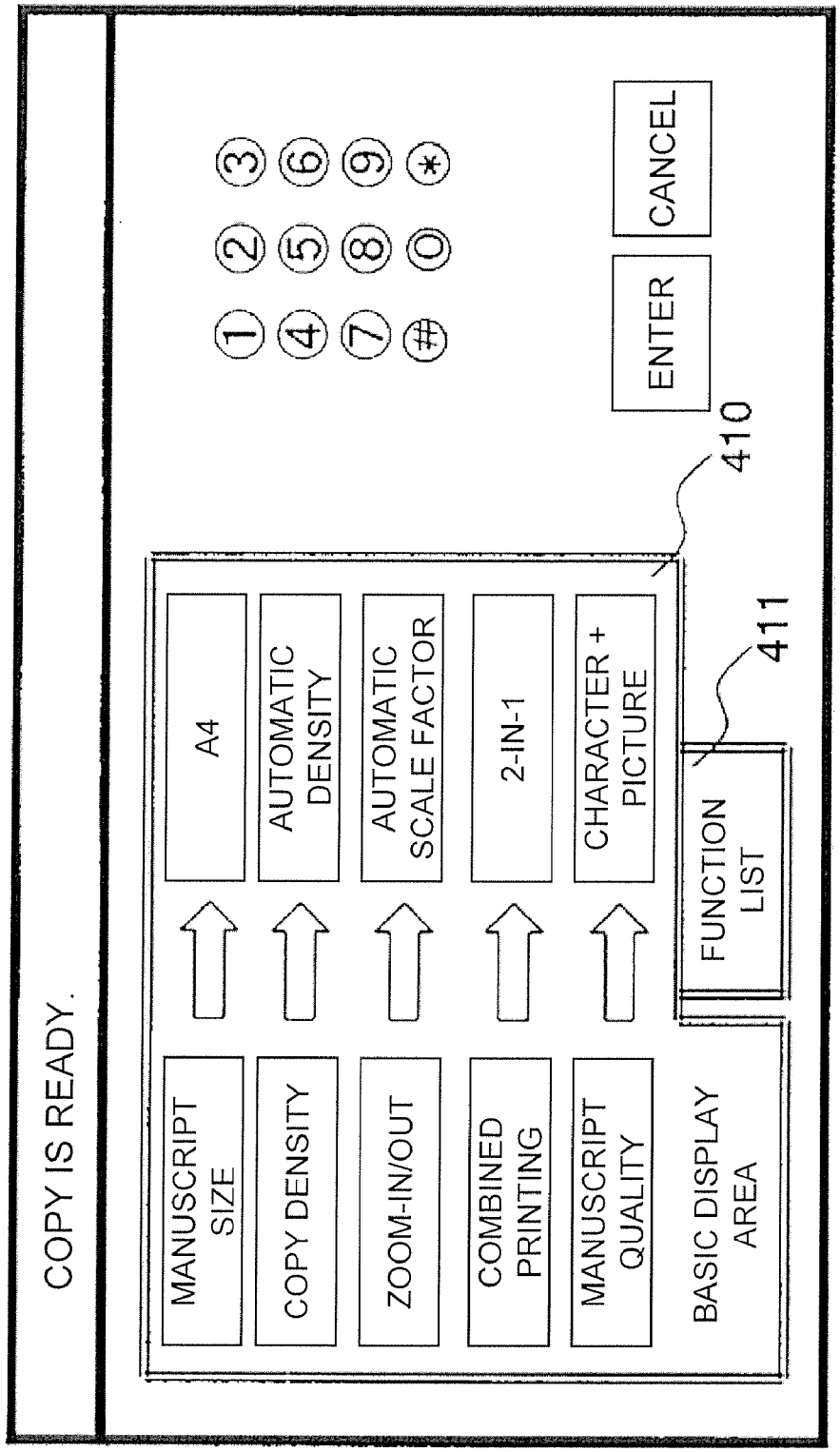
FIG. 4 is a view of an example screenshot displayed on a touch panel of the image forming apparatus.

FIG. 3 is a view of a diagram illustrating a software configuration of the MFP 100 of the present embodiment. When the above-mentioned copy procedure is performed, a setting display section 301 displays a default screen on the touch panel 300. FIG. 4 is a view of an example screenshot of the default screen. In the example of FIG. 4, buttons corresponding to five functions (i.e., "manuscript size," "copy density," "zoom in/out," "combined printing," and "manuscript quality") are displayed on a basic display area 410. The functions of "manuscript size," "copy density," "zoom in/out," "combined printing," and "manuscript quality" are respectively set to "A4," "automatic density," "automatic scale factor," "2-in-1," and "character+picture."

Figure 5:
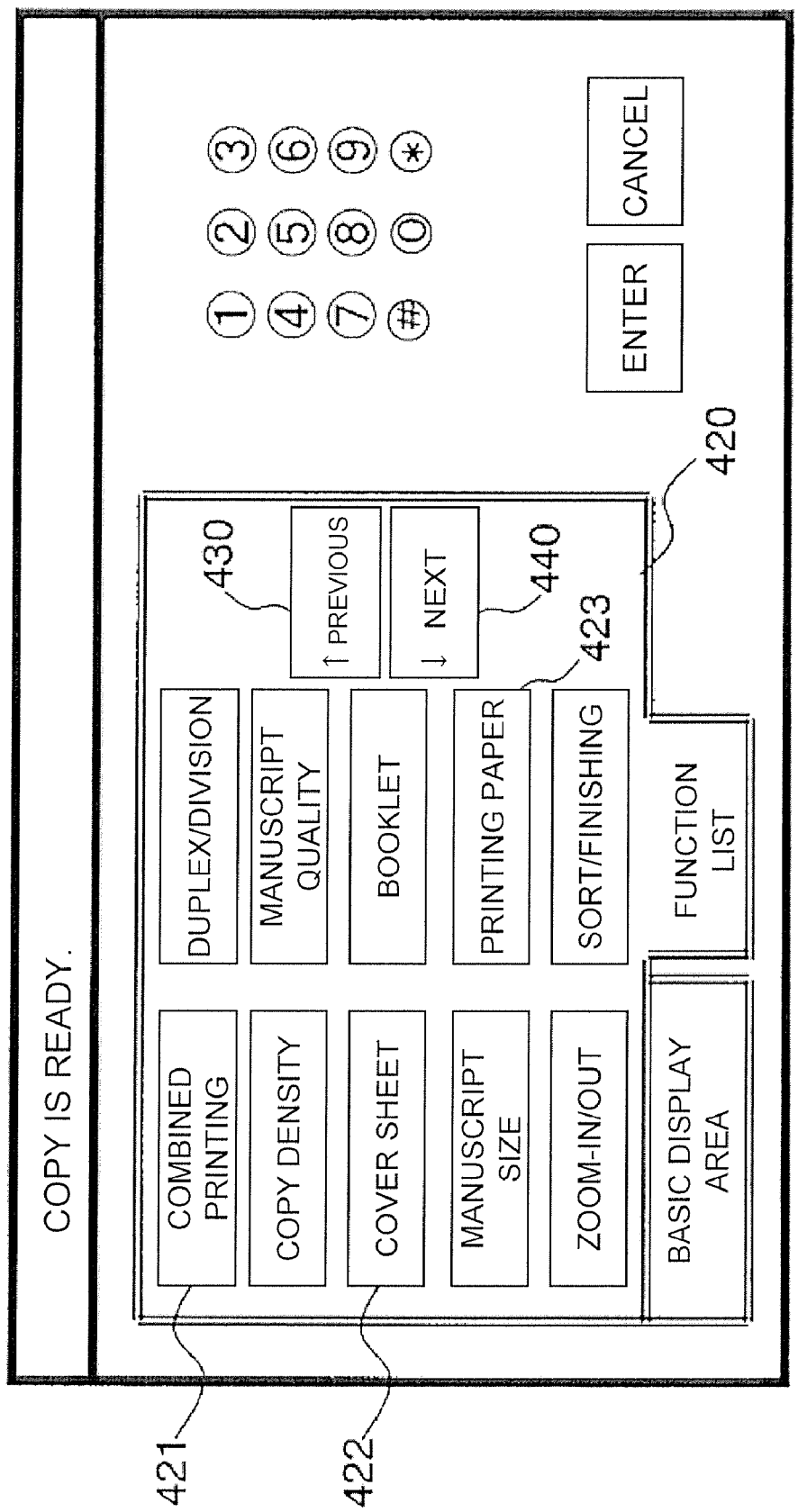
FIG. 5 is a view of another example screenshot displayed on the touch panel.

As seen in FIG. 5, when a "function list" tab 411 is pressed, the setting display section 301 displays a function list area 420 on the touch panel 300. FIG. 5 is an example screenshot of the function list area 420. In addition to the above-mentioned five functions, buttons corresponding to additional five functions (i.e., "duplex/division," "cover sheet," "booklet," "printing paper," and "sort/finishing") are displayed on the function list area 420. Note that the MFP 100 of the present invention is configured to be capable of further setting a variety of functions. When a "next" button 440 or a "previous" button 430 is pressed, the function list area 420 accordingly scrolls up or down. Thus, a variety of functional buttons are configured to be displayed within the function list area 420.

Furthermore, referring to FIGS. 3 and 5, when a user presses a "cover sheet" button 422 on the touch panel 300 for setting a cover sheet function, the setting display section 301 takes out setting conditions of the cover sheet function from a setting section 302 and displays the setting conditions on the touch panel 300 as options. For example, the MFP 100 is configured to allow a user to select one from three options of the cover sheet function: "no setting;" "front cover;" and "front cover+back cover."

Here, a determination section 303 takes out current setting conditions of each function from the setting section 302, and determines if combinations of a predetermined option and other options of the setting conditions are permitted (i.e., whether or not the combinations are incompatible).

Figure 6:
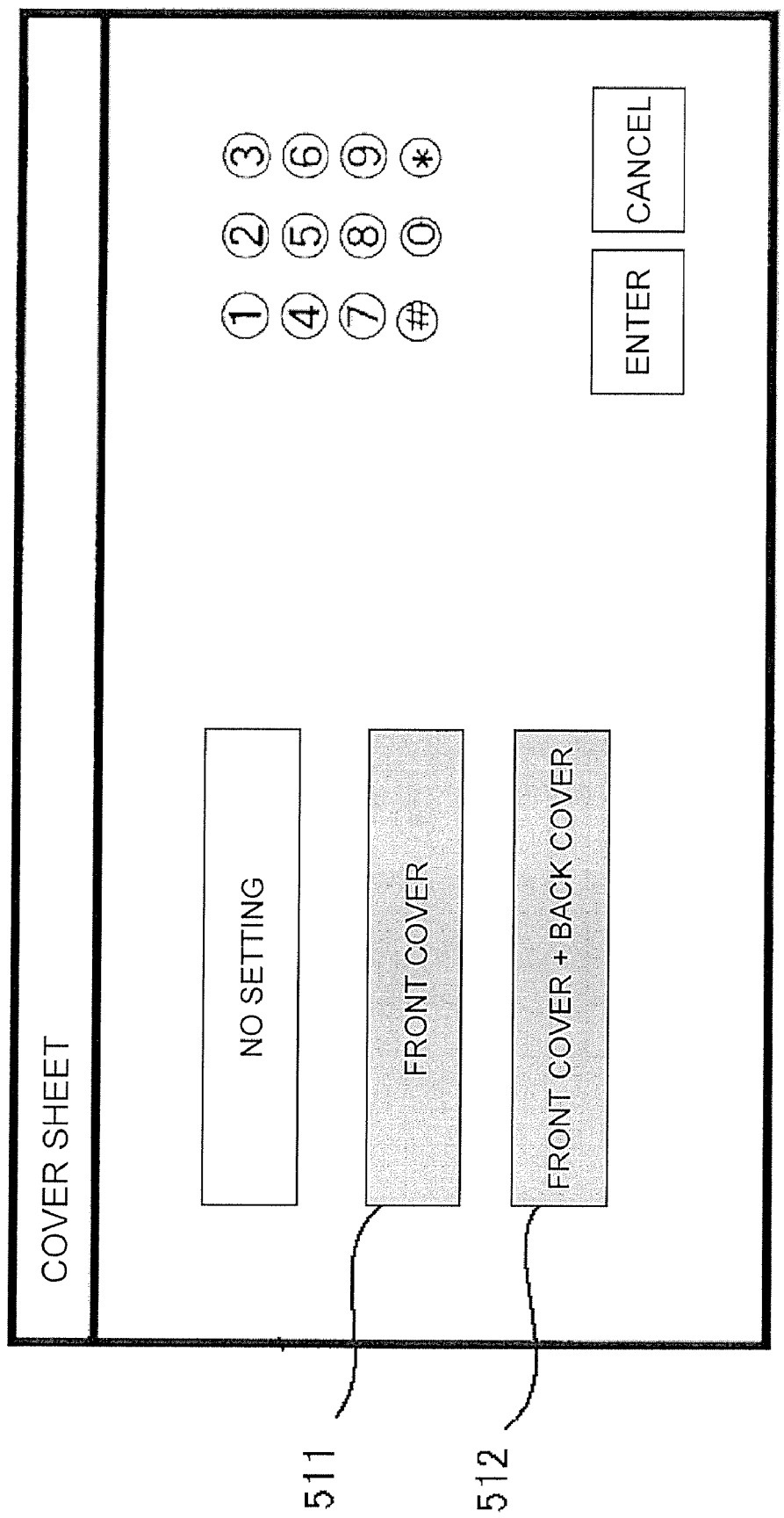
FIG. 6 is a view of still another example screenshot displayed on the touch panel.
Figure 7:
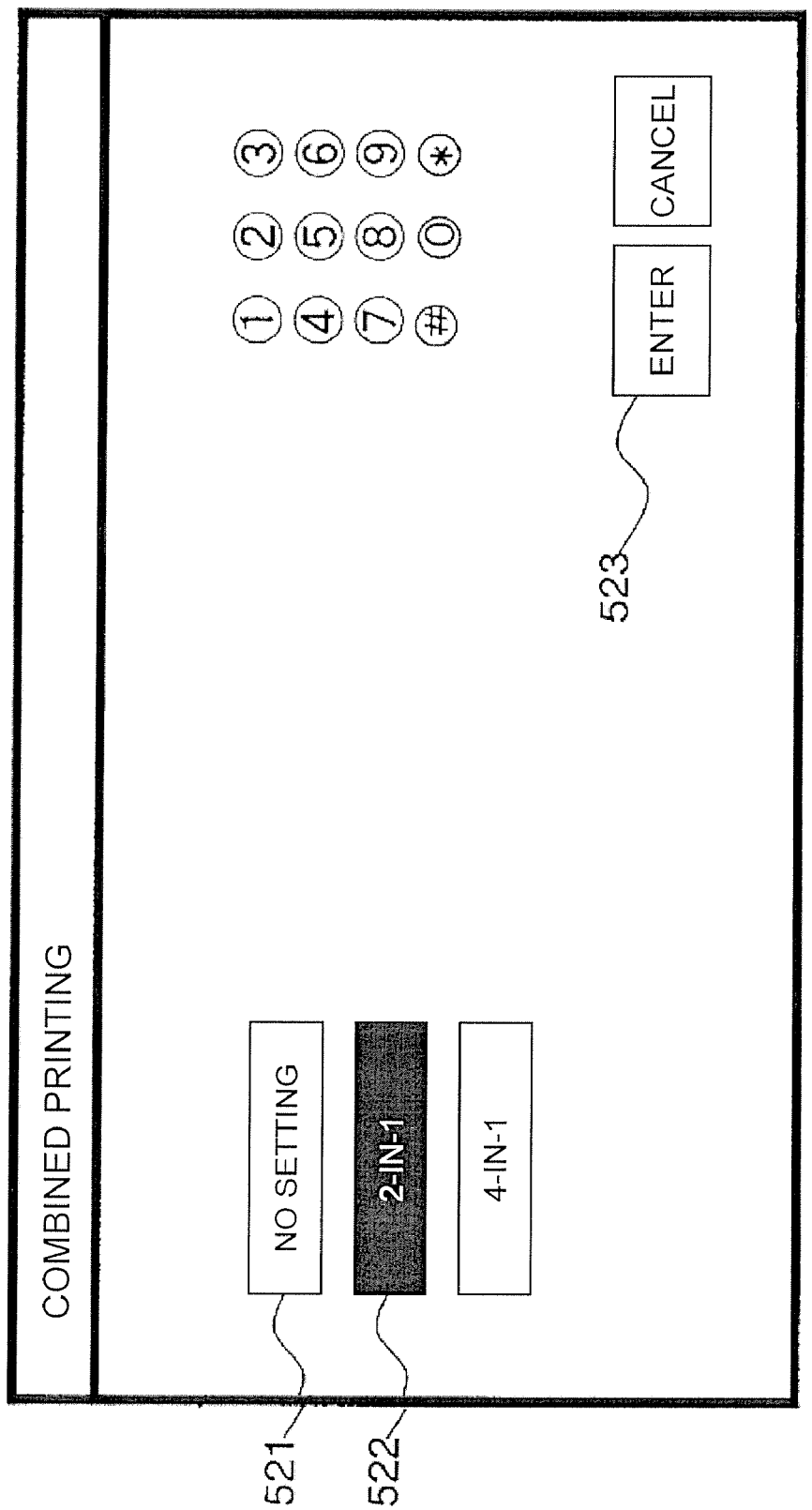
FIG. 7 is a view of yet another example screenshot displayed on the touch panel.

As described above, the "combined printing" function is set to "2-in-1" (see FIG. 4). Therefore, even if a user tries to set the cover sheet function, the user is not allowed to select a "front cover" option (i.e., "front cover" button 511) as illustrated in FIG. 6. In other words, the "front cover" option is incompatible with a "2-in-1" option (i.e., a "2-in-1" button 522) as illustrated in FIG. 7. Also, a "front cover+back cover" option (i.e., a "front cover+back cover" button 512) is also incompatible with the "2-in-1" option for the same reason.

Referring again to FIG. 3, thus, when the determination section 303 determines that options are incompatible in combination, a change section 304 displays a corresponding screen on the touch panel 300. FIG. 6 is an example screenshot of the screen. Here, the "front cover" button 511 is used for putting the front cover sheet while the "front cover+back cover" button 512 is used for putting both of the front and back cover sheets. As illustrated in FIG. 6, the buttons 511 and 512 are displayed as "grayout." Here, the term "grayout" means a state that a check box, a text box, or a button on a display screen is displayed in shallow gray color and a user is prohibited from selecting or inputting information into the check box, the text box, or the button. However, in the present invention, the change section 304 may not necessarily employ the grayout for displaying the incompatible options. The change section 304 may change the incompatible options in other methods as long as a user is capable of visually confirming the incompatible options.

However, when a user looks at the screen of FIG. 6, it is difficult for the user to specify readily a function responsible for an incompatible functional setting combination. In response to this, according to the MFP 100 of the present invention, when the grayout button 511 or 512 is pressed, an incompatible option display section 305 is configured to query the change section 304 about the function responsible for the incompatible functional combination. Then as illustrated in FIG. 7, a setting screen is displayed to show the other function with an option responsible for the incompatible functional combination (in this case, a screen of the combined printing function). In the example of FIG. 7, the button 522 is highlighted. In other words, the "2-in-1" option is being selected as the combined printing function. It should be understood that the button 522 is not necessarily highlighted and any type of display method may be used as long as a user is capable of visually confirming the currently selected button 522.

When a user looks at the highlighted button 522, the user notices that the combined printing function is erroneously set. The erroneous setting may be caused when a user wrongly sets a function as well as when a function had been previously set and the previously-executed setting has been stored without change. In response to the erroneous setting, a user is capable of re-setting the combined printing function by pressing an appropriate option button (e.g., a "without setting" button 521) and further pressing an "enter" button 523. Thus a user is capable of canceling the above-mentioned incompatible functional combination.

It should apparent from this disclosure that when there still exists an incompatible functional combination, the change section 304 displays the button relating to the incompatible combination as grayout on the setting screen of the combined printing function in FIG. 7. When a user further pressed the grayout button, the incompatible option display section 305 further displays a setting screen of another function responsible for the incompatible combination. Thus, a user is capable of canceling the incompatible functional combination by sequentially tracing a series of functional settings responsible for the incompatible functional combination.

In this case, when a predetermined functional setting is executed, it is possible to create a list of a series of incompatible functional combinations and display allowable functional combinations. However, the processing is preferably configured to display currently available options without changing the other functional settings.

As described above, according to the present invention, the incompatible option display section 305 is configured to display not only the buttons 511 and 512 (see FIG. 6) but also other functions to be combined with them (e.g., the "combined printing" function to be set through the default screen in FIG. 4) on the touch panel 300 when the other functions are responsible for an incompatible functional combination. Accordingly, a user is capable of changing the setting of the responsible option.

Additionally, when a user uses the MFP 100, the user is capable of setting his/her important function in priority to the other functions. A user is also capable of changing settings of functions with low priority by sequentially tracing the setting screens of the functions. Thus, a user is capable of canceling the incompatible functional combination depending on his/her needs.

In a working environment (e.g., office of a company), for instance, a MFP 100 is often installed for each department in a company. In the environment, all the members of each department share the MFP 100. Therefore, it is conceivable that a user sets a predetermined function and subsequently another user tries to change a setting of another function. In this case, the former user's functional setting and the latter user's functional setting may be incompatible in combination. However, the former user is theoretically capable of setting a plurality of functions. Therefore, it is difficult to specify which function is actually the cause of the incompatible combination.

This is also true for such a case that a group of functional settings are set by a program as described in the section entitled "Related Art." Even when a user tries to change a part of a group of functional settings, the intended functional change may be incompatible with any of the original functional settings. In this case, it has been difficult to specify which functional setting is the cause of the incompatible combination.

Under the condition, only the currently setting function may be important for a user while settings of the other functions may be changed. In this case, it is effective to perform an operation (e.g., photocopy) by specifying a function responsible for the incompatible combination and canceling the setting of the specified function as soon as possible.

As described above, according to the present invention, it is possible for a user to cancel the incompatible condition of functions with low priority as suitable for user's needs by changing the settings of the functions while sequentially tracing the setting screens of the functions. Therefore, as described above, the present invention is especially effective for an image forming apparatus shared in an office of a company.

The image forming apparatus of the present invention is capable of clearly and quickly displaying a function responsible for the incompatible functional combination on a screen. Therefore, a user is capable of canceling the incompatible functional setting by changing the functional setting through the operation of the screen. Accordingly, the image forming apparatus of the present invention is useful as a printer, a copier, a MFP, and the like.

GENERAL INTERPRETATION

A used herein, the following directional terms "forward, rearward, above, downward, vertical, horizontal, below, and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image forming apparatus, comprising:
    a setting section being configured to set a plurality of image formation functions, the plurality of functions including first and second functions;
    a setting display section being configured to display selectably a single or plurality of options on each of setting screens, the single or plurality of options being set as a setting condition of each of the plurality of functions, the setting screens respectively corresponding to the plurality of functions;
    a determination section being configured to determine if a combination of an option of the first function and an option of the second function is incompatible;
    a change section being configured to change a display form of the option of the first function when the determination section determines that the combination is incompatible; and
    an incompatible option display section being configured to display a setting screen of the option of the second function when the option of the first function is selected after the display form of the option of the first function is changed.

2. The image forming apparatus according to claim 1, wherein the incompatible option display section is configured to display the setting screen of the option of the second function while changing a display form of the option of the second function.

3. The image forming apparatus according to claim 1, wherein the incompatible option display section is configured to display an operating button on the setting screen to cancel setting of the option of the second function.

4. The image forming apparatus according to claim 3, wherein the incompatible option display section is configured to display further an option of the second function compatible with the option of the first function on the setting screen, and
    wherein the setting of the option of the second function is canceled when the option of the second function compatible with the option of the first function is selected and the operating button is operated.

* * * * *